(12) United States Patent
Adamson et al.

(10) Patent No.: US 9,282,402 B2
(45) Date of Patent: Mar. 8, 2016

(54) AUDIO SYSTEM WITH INTEGRATED POWER, AUDIO SIGNAL AND CONTROL DISTRIBUTION

(71) Applicant: ADAMSON SYSTEMS ENGINEERING INC., Port Perry (CA)

(72) Inventors: Alan Brock Adamson, Greenbank (CA); Ben Cabot, Brooklin (CA)

(73) Assignee: ADAMSON SYSTEMS ENGINEERING INC., Port Perry, ON (CA)

( * ) Notice: Subject to any disclaimer, the term of this patent is extended or adjusted under 35 U.S.C. 154(b) by 248 days.

(21) Appl. No.: 13/829,208

(22) Filed: Mar. 14, 2013

(65) Prior Publication Data
US 2013/0251163 A1 Sep. 26, 2013

Related U.S. Application Data

(60) Provisional application No. 61/613,364, filed on Mar. 20, 2012.

(51) Int. Cl.
*H04R 27/00* (2006.01)
*H04R 3/00* (2006.01)
(Continued)

(52) U.S. Cl.
CPC ... *H04R 3/00* (2013.01); *H02J 7/00* (2013.01); *H02J 9/06* (2013.01); *H04R 3/12* (2013.01); *H04R 27/00* (2013.01); *H04R 2227/003* (2013.01)

(58) Field of Classification Search
CPC .......... H03G 3/348; H04R 3/00; H04R 3/12; H04R 27/00; H04R 2227/00; H04R 2227/003; H04R 2227/005; H02J 7/00; H02J 9/00; H02J 9/04; H02J 9/06

USPC ............ 381/77, 80, 58, 120; 330/51; 700/94; 713/300, 310, 320, 323, 324, 340
See application file for complete search history.

(56) References Cited

U.S. PATENT DOCUMENTS 4,887,298 A * 12/1989 Haigler ........................... 381/55
6,389,139 B1 * 5/2002 Curtis et al. .................. 381/105
(Continued)

FOREIGN PATENT DOCUMENTS

| EP | 1061656 | 12/2000 |
|---|---|---|
| WO | 03013041 | 2/2003 |
| WO | 2006100515 | 9/2006 |

*Primary Examiner* — Vivian Chin
*Assistant Examiner* — Jason R Kurr
(74) *Attorney, Agent, or Firm* — Lynn C. Schumacher; Stephen W. Leonard; Hill & Schumacher

(57) ABSTRACT

A control and distribution system provides electrical power distribution, audio signal distribution, and control signal distribution to one or more audio components, such as a powered loudspeaker element or a signal conditioning device such as a rack-mounted amplifier. Embodiments allow for the monitoring and/or control of parameters and/or components at or near the endpoint of the system. These parameters or components include low-level parameters associated with the external audio devices, as opposed to merely higher level parameters of the system. The control and distribution system may include an uninterrupted power source for providing power in an online or offline mode to selected components of the external audio devices. In some embodiments, online backup power is provided to low-power components without providing power to amplifiers within the external audio devices.

39 Claims, 9 Drawing Sheets

(51) Int. Cl.
*H04R 3/12* (2006.01)
*H02J 7/00* (2006.01)
*H02J 9/06* (2006.01)

(56) References Cited

U.S. PATENT DOCUMENTS

| | | | |
|---|---|---|---|
| 7,428,311 B2* | 9/2008 | Curran | G08B 3/10 340/286.02 |
| 7,443,133 B2 | 10/2008 | Hamada et al. | |
| 8,311,235 B2* | 11/2012 | Takada et al. | 381/77 |
| 2003/0220705 A1* | 11/2003 | Ibey | 700/94 |
| 2004/0088064 A1* | 5/2004 | Endo | H04B 1/20 700/94 |
| 2005/0036248 A1 | 2/2005 | Klikic et al. | |
| 2005/0113847 A1* | 5/2005 | Gadberry | A61B 17/128 606/143 |
| 2006/0176111 A1* | 8/2006 | Takei | 330/51 |
| 2007/0204174 A1 | 8/2007 | Dorogusker et al. | |
| 2007/0237337 A1* | 10/2007 | Mah | H04R 5/04 381/77 |
| 2008/0075305 A1 | 3/2008 | Madonna et al. | |
| 2009/0003619 A1 | 1/2009 | Solow | |
| 2009/0316707 A1 | 12/2009 | Hawley et al. | |
| 2010/0316237 A1 | 12/2010 | Elberbaum | |

\* cited by examiner (a)

(b)

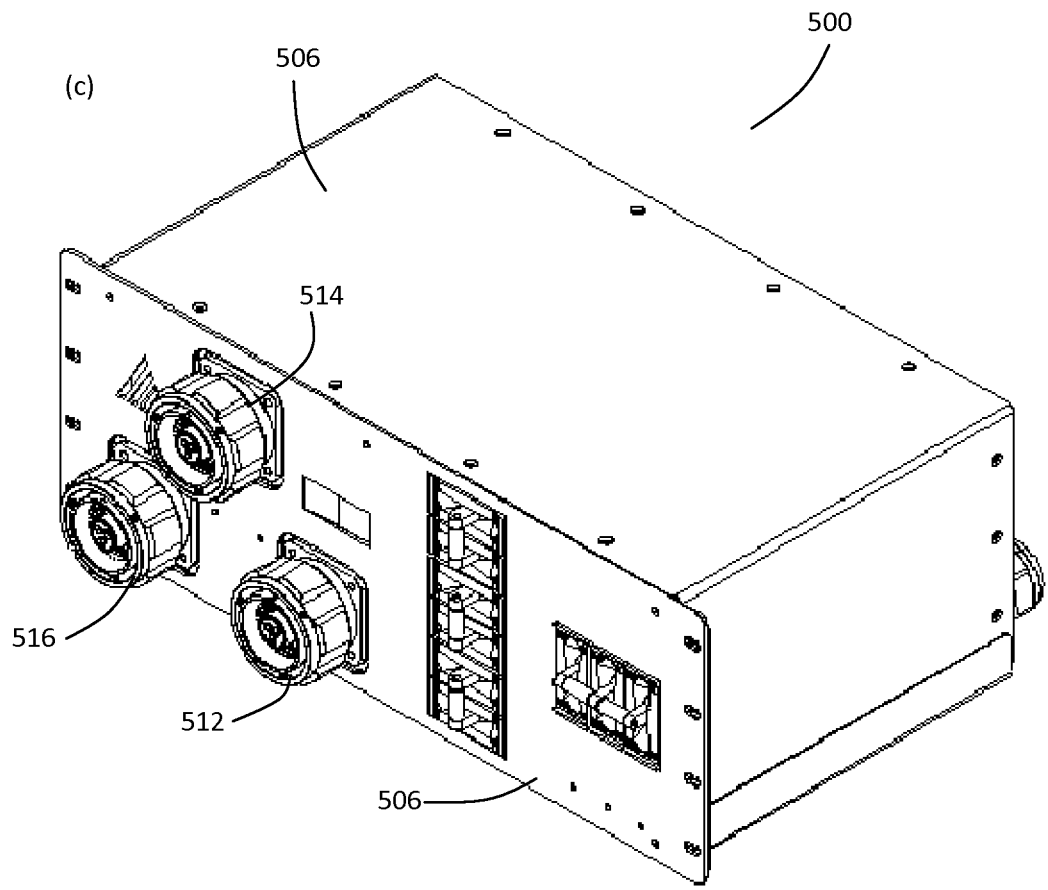
Figure 5 (Cont')

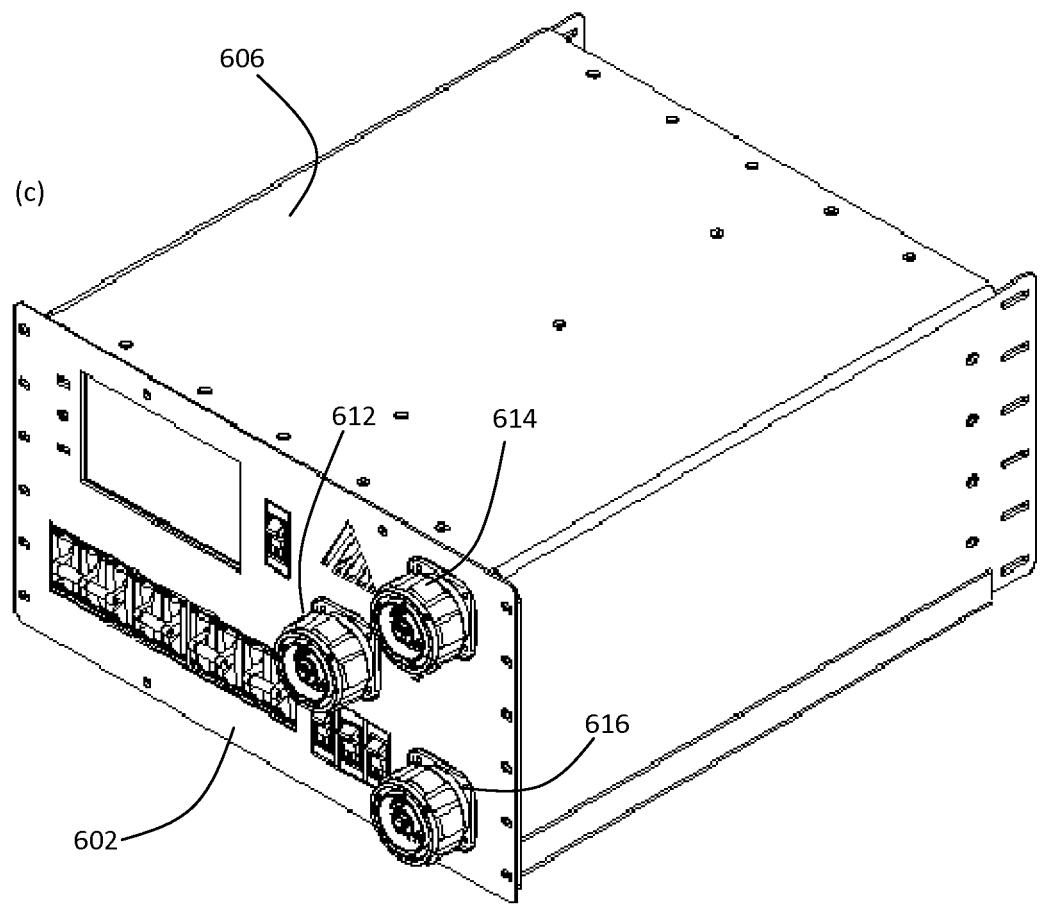
Figure 6 (Cont')

AUDIO SYSTEM WITH INTEGRATED POWER, AUDIO SIGNAL AND CONTROL DISTRIBUTION

CROSS-REFERENCE TO RELATED APPLICATION

This application claims priority to U.S. Provisional Application No. 61/613,364, titled "AUDIO SYSTEM WITH INTEGRATED POWER, AUDIO SIGNAL AND CONTROL DISTRIBUTION" and filed on Mar. 20, 2012, the entire contents of which is incorporated herein by reference.

BACKGROUND

The disclosure relates generally to the distribution of electrical power, audio signals, and control signals in audio systems used in applications collectively referred to as sound reinforcement. In particular, the disclosure relates to the distribution of electrical power, audio signals, and control signals in audio systems that utilize power amplifiers, signal processing equipment and audio networking components.

Large arrays of loudspeaker enclosure assemblies have been standard for producing high sound pressure levels for concert production and performance installation for several decades. Since these assemblies are then joined together to form an array of the desired geometry, functionality and performance, the more sophisticated loudspeaker enclosure assemblies are now frequently called array elements that, when assembled in a group for use, are referred to as a loudspeaker array. In nearly all applications in large venues arrays are raised above the audience with electric chain hoists utilizing rigging hardware attached to the array element. This process is referred to as "flying" a sound system. Once an array is in the air, it is said to be "flown".

Loudspeaker arrays have for many decades been provided an amplified signal from power amplifiers in equipment racks, which are located at floor level behind an array if the array is stacked on the ground, or are located beneath an array if it is raised into the air with rigging equipment (flown). In some cases the amplifier racks may be elevated with a flown array or placed, for example on an elevated catwalk in a stadium. In a large concert, each array may require mains power in the range of 20-50 kilowatts. Large systems are most frequently powered by a 220-230 volt three-phase supply.

Racks of amplifiers are typically provided a conditioned audio signal specific to the requirement of the audio transducers within the array elements that the amplifiers are powering. Typical audio signals are either analog or digital.

In more complex examples, power amplifiers are devised with a variety of audio and control inputs. Network endpoints, digital audio and analog inputs are common for delivery of the audio signal while the control may be delivered via a dedicated serial line, Ethernet or other IP transport. DSP is commonly added to such amplifiers and is found physically within the amplifier and electrically prior to its input stage. Amplifiers such as these can be referred to as networked processed amplifiers.

In the last decade, it has become common practice in small professional use loudspeaker systems to place one or more channels of power amplification within the loudspeaker system and provide connections to supply electrical power to the amplifier and an audio signal to the amplifier. This allows the manufacturer to define and control a closely matched relationship between the transducers and the amplifiers. In such systems, the signal sent to the loudspeaker is generally processed in a user programmable DSP prior to its delivery to the powered loudspeaker. The program in the DSP would be configured to divide the signal spectrally and further equalize it to achieve the desired response from the loudspeaker. Optimization of both cost and performance can therefore be maximized. Such loudspeakers are referred to as powered loudspeakers. A limitation exists however with this structure since the operator may configure the DSP incorrectly for the loudspeaker.

Somewhat more complex loudspeaker designs incorporate DSP into the loudspeaker enclosure assembly. This step insures that the operator of the system always maintains a correct match between the transducers, power and DSP. Loudspeakers such as these can be referred to as powered and processed loudspeakers.

In more advanced systems, the signal is transmitted to the loudspeaker system via network audio. This configuration allows for more creative control of sound system architecture as well as adding an element of user friendliness. Notwithstanding their complexity, small systems such as these do not generally create insurmountable operational problems since small loudspeakers are most often employed where they are accessible by a technician.

Powered array elements for use in the largest audio systems have been available for more than a decade. An assembly of powered array elements is often referred to as a powered array. The first of these systems in the market employed simple electrical powering and audio signal connection schemes. Typically a rubber coated cable (cab tire) with locking plugs and sockets is used to energize the amplifiers with mains voltage. The audio signal is fed to the array elements via a separate shielded cable.

In more recent examples now in use, the power and signal are first fed into a compact rack mounted module. There they are combined into a single multi-pin connector and then passed to the powered array element through a multi conductor cable which is designed to carry both signal and electrical power.

In most cases, additional signal transceivers are required, for transmitting system control data or information gathered from the powered array element. In examples where the audio signal is AES/EBU transmitted on a twisted pair of conductors, additional conductors may be required. In examples where networked audio is used, all the required information can be exchanged via the network.

Unfortunately, in spite of the benefit of integrating system components, powered arrays have proven to be operationally difficult and susceptible to problems associated with the interruption of audio signals. The interruption of audio signals in such systems occurs at a significant cost. Highly paid entertainers performing in front of large audiences, heads of state addressing nations and religious leaders addressing hundreds of thousands of followers illustrate the penalty for audio system failure.

The interruption of audio signals in powered array systems can result, for example, from loss of control of the power amplifiers, loss of control of DSP system, and/or loss of audio network signal. When these problems occur, they are exacerbated by the poor accessibility of the electronics, since most systems are flown in use.

A particular problem associated with loss of power and/or signal or control transmission is the time required for electrical components within the powered array element to recover. The recovery time of electrically energized audio components following a power failure varies widely. Typically, older analog components will restart with the least time delay. Digital audio devices generally take longer to recover since most devices contain a CPU or microcontroller of some sort that must reboot its software or firmware before it is ready for use.

Audio network devices are the most prone to delay upon restart since the device must first reboot its internal software and then reconnect to other devices on the network. In some cases, significant additional delays may be encountered because of lost network configuration information. For example, network connections and configurations may involve excessive time to restore after power failures that were accompanied by erratic electrical interference. Some delays can extrapolate into a network crash that can demand hours of debugging time from system engineers.

In light of these issues with powered array elements, some users take steps such as running parallel analog lines and/or network lines for redundancy purposes. Specifically, the stability of network audio signals is subject to some of the same limitations as Ethernet based networks such as sensitivity to electrical power fluctuations.

These problems can occur due to a host of causes, such as exposure of the array element and electronics to adverse weather conditions, which can interfere with electrical performance. Other limitations of powered array elements include the complexity of the design process, the increased weight of the array element, and presently, the lack of an industry standard.

Powered arrays do not presently adhere to an industry standard, although acceptance of the concept is becoming more widespread. Some manufacturers, on the other hand, have stated emphatically that they will not participate in the development of any powered array elements. One reason of the slow acceptance of this technology is the lack of a universally accepted network audio standard. The result is a host of proprietary hardware solutions, of which many lack the sophistication which results from standardization and mass production. Another aspect is the perception that the electronic technology within the array element will be difficult to control in any failure mode and inaccessible for service, as described above.

It is further noted that that while these problems are most apparent in the powered and processed array, conventionally powered loudspeakers which are networked in an array can be susceptible to similar problems. Even though the amplifiers and network electronics are more accessible, power fluctuations and interruptions can equally interfere with network and audio signal integrity.

Some system users have attempted to provide backup power to a loudspeaker array using an uninterruptable power supply (UPS). UPS battery voltages typically range from 12 to 72 VDC. In a small UPS, the battery may be a single unit at the lower end of the voltage range, whereas in large UPSs, the batteries will include multiple units generally connected in a series parallel circuit. Typically, a UPS providing inverter output of 240 volts will have a battery voltage not exceeding 72 VDC.

Inverter output voltage and power will generally vary according to requirement. A small UPS for a personal computer in North America will have an output voltage of 115 volts and a capacity of several hundred watts. A large industrial UPS might have a three phase output of up to 600 volts and capacities in excess of 50 kilowatts In order to provide backup power to a loudspeaker system, a UPS would be required to supply the full power to the amplifiers that power the array. A typical single high powered array element would require a UPS capable of supplying input electrical power in the order of 2-3 kilowatts; a large array of such elements will require input power in excess of 50 kilowatts. An array will be typically powered by a three phase supply at 220-240 volts. The same calculation applies to powered arrays as well as conventional arrays.

A typical UPS of that size would occupy nearly one cubic meter of space, weigh somewhat more than a tone and dissipate more than 15,000 BTUs during operation. Furthermore, available UPSs are designed assuming the presence of standby generator power. Typical battery life is less than five minutes. An UPS of this size and configuration, in most applications, is therefore not a practical solution for an audio system.

SUMMARY

A control and distribution system provides electrical power distribution, audio signal distribution, and control signal distribution to one or more audio components, such as a powered loudspeaker element or a signal conditioning device such as a rack-mounted amplifier. Embodiments allow for the monitoring and/or control of parameters and/or components within the distribution system, or within devices attached to the system which may be at or near the endpoint of the system. These parameters or components include low-level parameters associated with external audio devices and the associated distribution system. These low-level parameters are typically unavailable for monitoring in conventional systems, as opposed to merely higher level parameters that are typically observable in such systems. The control and distribution system may include an uninterrupted power source for providing power in an online or offline mode to selected components of the external audio devices. In some embodiments, online backup power is provided to low-power components without providing power to amplifiers within the external audio devices.

Accordingly, in one aspect, there is provided an audio, control and power distribution system for operating one or more external audio devices, comprising:

an input power interface for receiving external mains power and for providing primary power for the one or more audio devices based on the external mains power;

one or more input audio interfaces for receiving audio signals;

an output interface provided for external audio devices, wherein said output interface is configured to provide the primary power, the audio signals, and a control signal to the external audio devices;

a transceiver for transmitting and/or receiving the control signal; and a processor operatively coupled to the transceiver for generating and/or processing the control signal.

The system may also include one or more optional control inputs for receiving control signals. Furthermore, the system may further include a display device providing a control and operational user interface for interactively observing and operating various aspects of the audio, control and power distribution system and the audio devices connected to the system A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Figure 1:
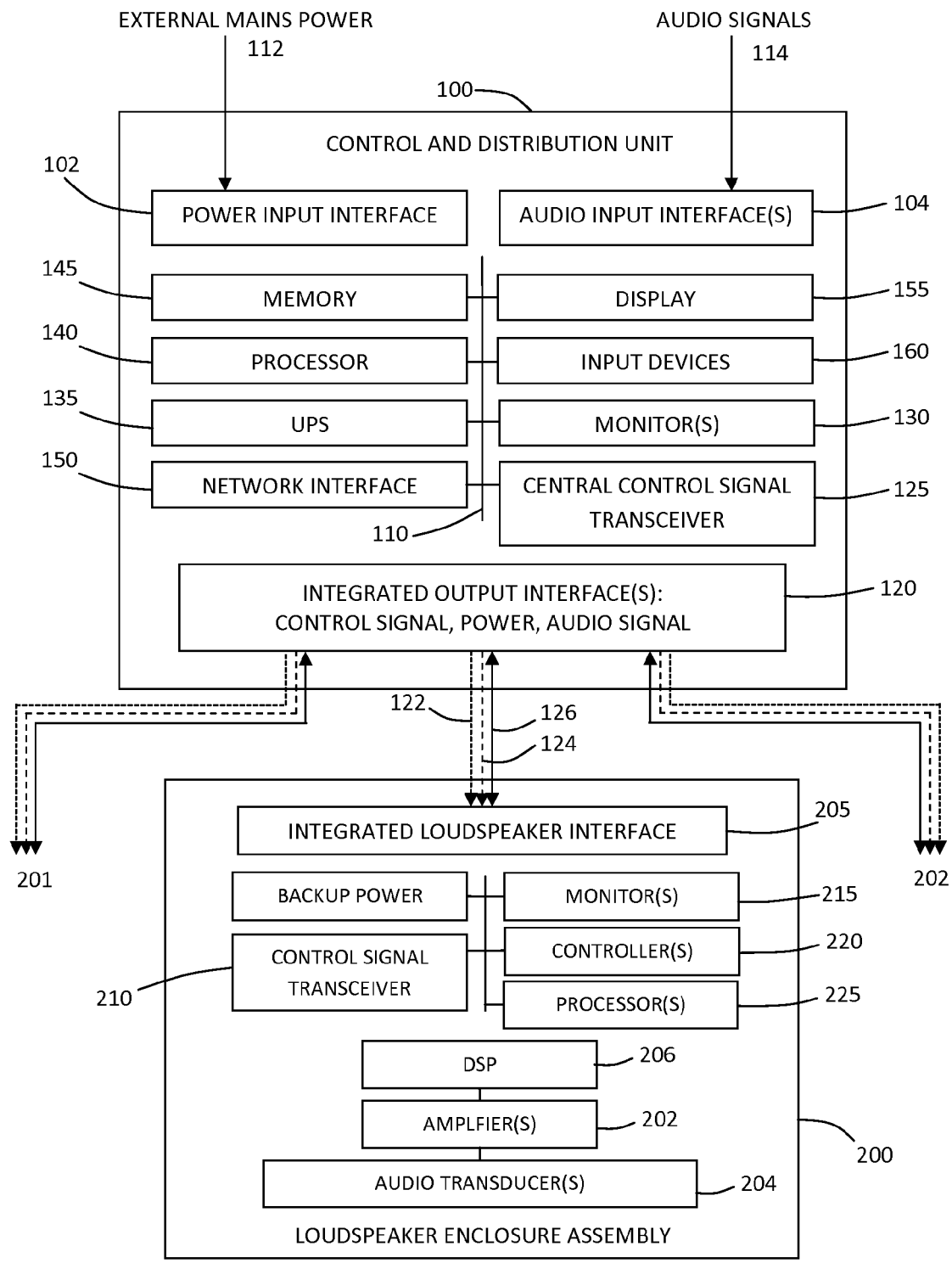
FIG. 1 is a block diagram illustrating an example audio system including a control and distribution unit interfaced with a loudspeaker enclosure assembly.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. It should be understood that the order of the steps of the methods disclosed herein is immaterial so long as the methods remain operable. Moreover, two or more steps may be conducted simultaneously or in a different order than recited herein unless otherwise specified.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the terms "loudspeaker enclosure assembly" and "array element" refer to a loudspeaker assembly that may include audio transducers, enclosures which define volumes of air for related low and mid frequency transducers, horns or wave shaping sound chambers and related transducers, rigging hardware (often referred to as fly hardware), amplifiers, heat sinks, digital signal processing hardware or networking hardware, or some combination of these. It is to be understood that a "loudspeaker enclosure assembly" and "array element" may also include other components that would be familiar to skilled in the art of professional audio.

As used herein, the term "analog signal" refers to a continuously varying electrical signal. An analog signal is typically transmitted via cable which has a shielded twisted pair of conductors plus a ground conductor; the connector used is generally a standard 3 pin XLR, which has been in use for decades.

As used herein, the term "digital audio signal" is a pulse code modulated signal. A digital audio signal may conform to the AES/EBU specification for digital audio and may be transmitted via cable and connectors that are similar to the analog cable and connectors mentioned above. The signal path may resemble a typical analog layout, in that a discrete signal is transmitted from a connector on one piece of equipment to a connector on another.

As used herein, the term "network audio signal" refers to a form of encoded audio signal that is relayed as data over a network of connections and equipment following a network protocol, such as internet protocol (IP). For example, some audio networks are similar to, or part of, the Ethernet specification, and may be referred to as audio IP transport or AVB respectively. The transmission cable may be the same as Ethernet with either Cat 5/6 wire or optical fiber.

As used herein, the term "digital signal processor" (DSP) refers to one or more processors for processing audio signals. DSP may process audio signals by splitting the audio signal into frequency bands and providing equalization and control of audio levels to achieve desired sound pressure levels (SPL). DSPs perform the processing numerically and are available with inputs and outputs may conform to any type of audio signal. In some examples, a DSP for an audio system may be provided as a standalone rack mounted electronic component.

As used herein, the term "powered loudspeaker" refers to a loudspeaker containing an amplifier dedicated to the operation of that loudspeaker.

As used herein, the term "powered and processed loudspeaker" refers to a powered loudspeaker that also contains DSP for the purpose of conditioning the audio signal for the amplifiers within that loudspeaker As used herein, the term "networked processed amplifier" refers to an amplifier with onboard DSP and the capability to receive audio and control signals.

As used herein, the term "powered array element" refers to a powered (and optionally processed) loudspeaker that is designed as an element of an array.

As used herein, the term "powered array" refers to an array of powered array elements.

As used herein, the term "uninterrupted power supply" or UPS refers to a power supply capable of providing power at least in the event of a failure of a mains power supply. A UPS may be an offline UPS or an online UPS, both of which are described in further detail below.

Embodiments of the present disclosure provide a control and distribution system for providing electrical power distribution, audio signal distribution, and control signal distribution to one or more audio components, such as a powered loudspeaker element or a signal conditioning device such as a rack-mounted amplifier. Unlike existing approaches for managing aspects of an audio system, the present embodiments allow for the monitoring and/or control of parameters and/or components at or near the endpoint of the system. These parameters or components include low-level parameters associated with the external audio devices, as opposed to merely higher level parameters of the system.

FIG. 1 provides a block diagram illustrating one example embodiment in which a central control and distribution unit (CDU) 100 is employed for the distribution of electrical power, audio signals, and control signals, to one or more external audio devices 200-202. CDU 100 includes a chassis or other physical structure for mounting connectors and cables to receive and transmit electrical power and audio signals. For illustrative purposes, FIG. 1 shows a powered and processed loudspeaker enclosure assembly 200, which includes amplifier(s) 202, audio transducer(s) 204, and DSP 206, as an example external audio device. It is to be understood that the remote audio devices may be other types of audio devices, such as non-processed loudspeaker enclosure assemblies which may or may not include a powered amplifier, and rack mounted amplifier and/or DSP units that are physically separate from a loudspeaker enclosure assembly (such as powered processed amplifiers). Although the system is shown in which power and audio signals are distributed to up to three audio devices 200-202, it is to be understood that the maximum number of external audio devices that may be connected to CDU 100 is not intended to be limited to three devices.

CDU 100 includes power input interface 102 for receiving external mains power 112 and audio input interface(s) 104 for receiving input audio signals 114. External mains power 112 may be any power source that is capable of providing sufficient and appropriate power for the audio devices 200-202 to which CDU 100 is connected. For example, external mains power 112 may be three-phase AC power.

Input audio signals 114 may be any suitable electrical audio signals, including one or more analog audio signals, digital audio signals, or network audio signals. In some embodiments, input audio signals 114 may include external control signals, which may be encoded with input audio signals according to a digital encoding and/or network protocol. For example, an external control signal may be encoded with an input audio signal on a network audio signal such as an AVB signal. As discussed further below, an external control signal included with audio signal 114 may be provided by a network management system (NMS).

CDU 100 is configured to distribute external mains power 112, which is received at power input interface 102, to audio devices 200-202, through output interfaces 120. The distribution of power from integrated output interface 120 to loudspeaker enclosure assembly 200 is indicated in FIG. 1 by line 122. For example, in one embodiment in which external mains power 112 is three-phase power and there are three external audio devices 200-202, three output interfaces 120 may be employed to each provide single phase power to each audio device, as further described in the examples below.

CDU 100 also provides audio/control signal distribution to audio devices 200-202. In one embodiment, audio signals 114 received at audio input interface 104 are passed through CDU 100 to integrated output interfaces 120 without modification and/or conversion. The distribution of an audio signal from integrated output interface 120 to loudspeaker enclosure assembly 200 is indicated in FIG. 1 by line 124.

In addition to providing power and audio/control signal distribution to audio devices 200-202, CDU 100 also distributes, via integrated output interfaces 120, a control signal to audio devices 200-202. The control signal, which may be bi-directional, is provided to monitor and/or control one or more parameters or electrical components associated with audio devices 200-202. The distribution of the control signal from integrated output interface 120 to loudspeaker enclosure assembly 200 is indicated in FIG. 1 by line.

In one embodiment, as further described in the examples below, the power, audio signal and control connections to a given audio device may be provided through a single cable that houses a plurality of suitable electrical conduits. Accordingly, a given integrated output interface 120 for distributing power, audio signal(s) and the control signal to a given audio device may be provided as a single connector interface for connecting to the single cable. In another example embodiment, one or more output interfaces may be provided as two or more connectors for distributing power, audio signal(s) and the control signal to a given audio device. In another example embodiment, one or more of the output interfaces may include a wireless transceiver (e.g. an electrical wireless transceiver or an optical wireless transceiver) for transmitting audio signal(s) and/or the control signal to a given audio device.

The control signal can be transmitted according to any one or more of a wide variety of signal formats and transport and/or data encapsulation protocols. In one embodiment, the control signal is provided on a serial connection, such as, but not limited to, RS232 or RS485, or SPI. In other example embodiments, the control signal may be provided in the form of a packet based protocol such as AVB and IP over Ethernet. Accordingly, CDU 100 includes central control signal transceiver 125 for transmitting and receiving control and/or monitoring data via the control signal, where central control signal transceiver 125 is in communication with integrated output interfaces 120 for distribution and reception of the control signal to and from audio devices 200-202.

In order to receive the distributed control signal, distributed power, and distributed audio signal, an integrated interface is provided in each audio device 200-202 that is connected to the CDU. For example, as shown in FIG. 1, loudspeaker enclosure assembly 200 includes integrated loudspeaker interface 205, which receives power through distribution path 122, audio signal through path 124, and control signal through path 126. As noted above, the power, audio signal and control connections to a given audio device may be provided through a single cable that houses a plurality of suitable electrical conduits. Such a cable may be received at loudspeaker enclosure assembly 200 by a single connector interface 205.

As shown in FIG. 1, loudspeaker enclosure assembly 200, like CDU 100, includes a control signal transceiver 210 for receiving the control signal distributed by CDU 100 and transmitting a control signal back to CDU 100. The control signal path may be interfaced with one or more monitoring devices 215, and/or one or more controllers 220 (or processors/CPUs 225), within each external audio device 200-202, for monitoring and/or controlling parameters and/or components of the external audio devices 200-202. Processors 225 may also be provided for communicating with CDU 100 and/or processing instructions received by control signal transceiver 210.

A wide variety of parameters and/or components may be monitored and/or controlled within external audio devices 200-202 by CDU 100. In order to support the monitoring of a given parameter or component, suitable monitoring devices 215 are included within external audio devices 200-202. For example, in order to monitor current, a suitable current monitoring device, such as a current transformer, is provided. Similarly, in order to control a given component within an external audio device, suitable control devices 220 (such as OP AMPs and FET switches) may be provided.

In one example, in which a given external audio device includes a powered amplifier, the control signal may be employed to monitor parameters associated with heat/temperature, such as heat sink temperature, PCB temperature. The control signal may also monitor parameters associated with power consumption, such as power supply output and/or power per channel.

In the example shown in which external audio device 200 is a loudspeaker enclosure assembly, the control signal may monitor the complex impedance of the electrical signal delivered to one or more loudspeaker elements within the loudspeaker enclosure assembly. For example, the monitoring of the impedance curve of the transducer allows for the assessment of the health of the transducer. Additional example parameters associated with the health of a loudspeaker element that may be monitored by the control signal include voice coil temperature, diaphragm displacement, and buzz/rub/distortion.

Additional monitored parameters may include positional information, such as the angle of orientation of a suspended array element, for example, using an inclinometer or other orientation or positing sensing device. In some systems, the angle or position of a given array element is controllable using an orientation or positioning device, and the control signal may be employed to control, via CDU 100, the angular orientation or position of the array element, optionally using feedback from a monitored angle sensing or position sensing device. For example, the angular orientation of an array element may be controlled by a motor (e.g. a stepper motor) that drives a screw, where the screw contacts (directly or indirectly), a location of the array element in order to vary the tilt of the array element (other controllable angular orientation and positioning devices will be known to those skilled in the art). Similarly, a motor driven rack and pinion device may be employed to control the relative positioning of an array element. CDU 100 may, in such an example embodiment, be programmed or otherwise instructed to drive the motor for varying the angular orientation of the array element.

In other embodiments, other devices for sensing or controlling the position and/or orientation of a loudspeaker enclosure assembly or array element may be monitored or controlled via the control signal. For example, the control signal may be employed for turning on or off a laser pointer attached to a loudspeaker enclosure assembly.

In addition to monitoring, the control signal may be employed to actively control (optionally according to a control loop employing feedback) one or more parameters or components of the audio system.

In one embodiment, the control signal can also be used to control parameters associated with heat/temperature. For example, the control signal may be employed to control a cooling fan. The control signal may also be employed to remotely control components within external audio devices 200-202. For example, the control signal may be employed to mute and/or power up or down amplifiers residing with the external audio devices 200-202. Similarly, the control signal may be employed to mute and/or power up the endpoints within the external audio devices 200-2002. In another example embodiment, the control signal may be employed to control a DSP residing in an external audio device 200-202, where the control signal may, for example, may selected the input to the DSP, and select or control the digital filtering function of the DSP (such as via the selection of a preset filter).

Additional example endpoint parameters that may be monitored include the status of the audio signal, AVB or Ethernet port status, endpoint power supply status, backup signal, and backup voltage. Furthermore, as shown in FIG. 1, an endpoint in an external audio device may include one or more processors 225 (and associated hardware not shown, such as memory and a power supply), and any or all aspects of software or firmware running processor(s), may be monitored and/or controlled by CDU 100 via the control channel. For example, in some loudspeaker enclosure assemblies, one or more remote computing devices (processors, chips, modules, or the like) may be provided for tasks such as managing network connections, locally controlling endpoint audio devices (e.g. DSP or amplifier) or other endpoint electronic devices, and performing diagnostics.

In some example embodiments, the endpoint processor(s) may run an operating system, such as LINUX, programmed with suitable drivers or applications. The control signal can be employed for the monitoring of the processor and its associated drivers or applications, including monitoring the status, health, error conditions, default settings, and the like. The control signal may also be employed to control the processor and its associated drivers or applications, such as uploading new settings or parameters, reporting error codes, and debugging. In one embodiment, this may be achieved using a watchdog timer, or a related diagnostic tool, which the status of which may be communicated to CFU 100 via control channel.

If the external audio device includes a DSP component, the control signal may be employed to monitor the status of the signal at or after the DSP. Also, in some audio system implementations, an amplifier may detect the signal at the speaker and provide this information to the DSP. The DSP program may then change a limiter or audio level. The information provided to the DSP, and/or the change made by the DSP, could be reported back from the DSP via the control signal. Also, in many implementations, the DSP will have "preset" filter configurations with names or numbers to describe them. The preset ID could be relayed back to CDU 100 via the control signal, and the control signal may be optionally employed by CDU 100 to control DSP, for example, via the selection of a preset filter ID.

In some embodiments, one or more of the external audio devices may include networked components. Accordingly, the control signal may be employed to monitor, and optionally control, networked components. For example, the status of networked components may be detected, and network parameters such as a local IP address may be monitored and/or controlled. One example of such a device is a network switch, which may be included as a component of the overall audio system.

In addition to monitoring parameters or components of external audio device 200-202, additional monitoring may be performed within the CDU 100 via monitors 130. For example, local electrical parameters within the CDU may be monitored, such as current, voltage, the status of audio signals (such as a primary audio signal, and optionally a secondary/backup/redundant signal). Additional example parameters that may be monitored include parameters of the incoming external mains power 112, including current consumption on each wire, voltage input, frequency input, and phase angle input, and overall quality of external mains power 112.

The control signal may also monitor the status of UPS 135, if present. Parameters of UPS 135 that may be monitored include inverter output, charger status, charge current, and battery condition.

As shown in FIG. 1, CDU 100 also includes one or more processors 140 (e.g. a central processing unit) and one or more memory components 145 interfaced with processor(s) 140, e.g. through bus 110. Memory 145 may include RAM, ROM, and/or other storage devices. Memory 140 may store a basic input/output system ("BIOS") for controlling low-level operation of CDU 100. The memory may also store an operating system for controlling the operation of CDU 100. It will be appreciated that this component may include a general purpose operating system such as a Windows, UNIX, or LINUX™, or a specialized client communication operating system such as iOS™, Android™, Windows Mobile™, or another operating system. The operating system may include, or interface with a Java virtual machine module that enables control of hardware components and/or operating system operations via Java application programs.

Memory 140 may further include one or more data storage elements, which can be utilized by CDU 100 to store, among other things, executable instructions and/or other data. Instructions, data or other information may also be stored on another other storage medium within CDU 100, such as hard disk, flash memory, or on an external storage device.

CDU 100 may optionally communicate with other computing devices through network interface 150. For example, CDU 100 may be configured for communication with one or more external computing devices, such as a computer, laptop, netbook, smartphone or tablet, or to additional network components, such as an Ethernet switch, or to slave devices in a master-slave configuration (described further below). In one embodiment, network interface 150 supports communication with a network management system (NMS). Accordingly, network interface 150 includes circuitry for coupling CDU 100 to one or more networks or external computing devices, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 150 is sometimes known as a transceiver, transceiving device, or network interface card (NIC).

Display 155 may be a liquid crystal display (LCD), gas plasma, light emitting diode (LED), or any other type of display used with a computing device. Display 155 may also include a touch sensitive screen arranged to receive input from an object such as a stylus or a digit from a human hand.

CDU 100 may include one or more input devices 160 for receiving input from a user. For example, a keypad, keyboard, mouse, buttons, knobs, or a haptic interface may be provided for receiving user input, such as commands or executable instructions. Alternatively, as mentioned above, user input may be provided through a touch screen display, or through an external computing device (such as a laptop, notebook, Smartphone or tablet) interfaced with CDU 100.

Embodiments of the disclosure can be implemented via the microprocessor(s) and/or the memory. For example, the functionalities described above can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

Accordingly, CDU 100 may include suitable computing elements and resources for processing the control signal, displaying or otherwise communicating the monitored parameters or components, and optionally controlling parameters or components in response to user input or executable instructions. For example, in one embodiment, CDU 100 may be configured, via programming or user input, to control one or more parameters or components in a feedback configuration, in which a feedback signal for controlling a parameter or component is provided through monitoring. The software capability of CDU 100 may therefore include sound system control functions so that an operator may respond to information gathered from sound system components, for example, via the control signal. This information may include detailed low-level information associated with the external audio devices, as described above.

In one embodiment, CDU 100 includes a user interface, which may take the form of a human machine interface (HMI), providing interaction between CDU 100 and a user or operator. Such interaction may include the monitoring and observation of any or all aspects of the CDU 100, as described above. The HMI may be provided directly through CDU 100 (e.g. via display 155), or through an external computing and/or display device interfaced with CDU 100. For example, the HMI may display information about the state of CDU 100, such as the presence of electrical power, the state of charge of batteries or the status of any of the connections to CDU 100. HMI thus provides a convenient integrated user interface for sound system operation, maintenance and/or trouble shooting.

Operator responses to this information might include controlling the distribution of available audio signals, turning on or off an audio signal to a specific device, limiting the output power of an amplifier or any other function as may be deemed appropriate for a system, device or component. The example system illustrated in FIG. 1 may be modified according to a variety of additional embodiments. For example, in order to improve the resiliency of the system, CDU 100 may distribute secondary or backup audio signals, control signals, and/or power. Furthermore, resiliency may be provided through the inclusion of power circuit breakers or switches, such as power circuit breakers for the external mains power 112 and for the output power delivered to the external audio devices 200-202.

As described above, embodiments of the present disclosure allow a user to perform direct monitoring and/or control of parameters or components of external audio devices, through an integrated control and distribution unit. Such a system may be useful in professional audio installations by providing backstage monitoring that is independent of a front of house (FOH) network management system NMS.

For example, the CDU may be employed for monitoring and/or control when a FOH NMS is not available or operational. This may occur, for example, during installation or teardown of a sound system, when it is useful to be able to obtain monitoring information and/or to control aspects of a sound system.

Furthermore, although many large performances or events will provide for FOH management of an audio system, it is common in smaller performances or events for the FOH to be absent, disconnect, or unmanned. For example, this may be the case in theatres running smaller productions, and ballrooms, halls, hotels, or other venues that may host smaller or mid-size events such as conferences and weddings. In such as a case, the present embodiments provide an integrated system that allows for monitoring and optional control of external audio devices, without the cost and complexity of setting up and/or managing a FOH.

Even when a NMS is available, CDU 100 may be employed to perform monitoring and/or control that is not achievable with a NMS. For example, low level parameter and/or components of the external audio devices are generally not available for monitoring and/or control through a NMS.

CDU 100 also provides for the independent monitoring, such as failsafe monitoring, by users other than FOH NMS users (such as backstage users, or users who own or are responsible for the audio system), in parallel with monitoring that may be performed using a FOH NMS. The independent monitoring enables a backstage user to monitor parameters that may not be of interest to a FOH user, such as the health of the audio transducers or other audio components. For example, if a given audio device is experiencing problems or may potentially fail or experience damage due to the actions of a FOH user, a backstage user may employ CDU 100 to monitor the audio device and optionally pre-emptively act to control the audio device, such as powering down the audio device before damage occurs.

In another embodiment, the system may include a microphone input, for example, via a tablet. The processor may be configured to perform an initial performance measurements such as phase (polarity) checking, and/or frequency sweep of the system. Such performance measurements may advantageously be performed prior to FOH setup and use.

In one embodiment, audio signals 114 include one or more secondary/backup/redundant audio signals that are also distributed via integrated output interface 120 to external audio devices 200-202. The secondary audio signals may be of the same type as the primary audio signal(s), or may be provided according to one or more additional audio signal formats. For example, in one example implementation, the primary audio signal(s) may be network audio signals (e.g. according to the AVB protocol), and the secondary audio signals may be analog or digital audio signals.

Similarly, the control signal may be a primary control signal that is distributed to external audio devices 200-202 with a secondary or backup control signal path. The secondary control signal may be of the same type as the primary control signal, or may be provided according to a different format.

In addition to providing redundancy for the distribution of the audio signals and control signal, CDU 100 may optionally further distribute backup power to selected electrical components residing within external audio devices 200-202. To address the full power needs of a loudspeaker system, that are dominated by the power requirements of the audio amplifiers in the system, a typical single high powered array element would require a UPS capable of supplying input electrical power in the order of 2-3 kilowatts, and a large array of such elements will require input power in excess of 50 kilowatts. As noted above, a typical UPS of that size would occupy nearly one cubic meter of space, weigh somewhat more than a tone and dissipate more than 15,000 BTUs during operation, rendering such an approach expensive and impractical.

By comparison, the non-amplification electrical components within a loudspeaker enclosure assembly that receive and transmit signals to various parts of the sound system consume substantially less power. For example, a DSP base audio device with eight output channels will typically consume in the range of 20 to 30 watts. An Ethernet audio switch with 24 ports might consume a little more than 50 watts.

Accordingly, some embodiments of the present disclosure provide a system in which backup power is provided for a selected subset of electrical components without providing full backup power to the audio amplifiers of the system. Such an embodiment enables the incorporation of a UPS within CDU 100 without excessive power, size and cost requirements. For example, in one example embodiment, backup power is provided to components having power requirements below a threshold power rating. In some embodiments, the threshold power rating providing online UPS backup power to a given component of the audio system may be approximately 10 W, 20 W, 50 W, and 100 W.

According to selected embodiments in which a UPS or other form of backup power is provided to non-amplification components, in the event of a power failure (such as a major power failure in an entertainment environment), continued operation of at least a portion of the sound system may be provided. As described in further detail below, a system including such a UPS (shown at 135 in FIG. 1) may provide against avoidance of loss of connectivity and the resulting need for rebooting of key electronic signal components. Furthermore, the control signal may be employed to provide monitoring of aspects of the UPS, such as battery charger parameters, setting the availability of UPS power to various devices.

Accordingly, in one embodiment, CDU 100 may be configured to provide uninterruptible power (battery) backup for selected electronic components connected to the UPS 135. The UPS may be an offline (or standby) UPS, or an online (or double conversion) UPS, or a UPS capable of both offline and online functionality (as described further below). The electronic components to which backup power is provided by the UPS may reside in the external audio devices and/or within CDU 100. It is further noted that although UPS 135 is shown in FIG. 1 as being integrated within CDU 100, it is also possible for the UPS to be provided as an external component of the system In one embodiment, an online (double conversion online) UPS may be employed, which converts all the load power continuously from alternating current (AC) electrical taken from the mains to direct current (DC) electricity by the use of a rectifier circuit. The DC current is used to maintain the charge the batteries and supply an AC inverter which converts DC power back to AC at the required voltage and provides it to the load. The double conversion online UPS supplies the AC to its load from the inverter at all times, not just during mains failure. Thus the UPS is described as "online". All the power is converted first from AC to DC in the rectifier and then from DC to AC hence the term, "double conversion". Upon mains failure, the sole changes are that the charger stops charging the batteries and the batteries provide the power to the inverter. There is no interruption in the supply of electricity to the load, but the penalty is that of lost efficiency. The rectifier and inverter perform at typically less than 85% efficiency and carry the whole load continuously with the attendant electrical cost.

Such an embodiment may be realized, for example, in a sound system including networked, powered loudspeakers that are provided signals and energized by CDU 100, where the signal and power may be combined together in a common cable or where the signal and power may be directed to a common electrically energized device. The UPS within CDU 100 may be configured to provide UPS power within the common cable or to the common device in such a manner that the selected electrical components (for example, with a selected function and/or power consumption) will be provided UPS power while other electrical components (for example, those that are not required for critical operation or consume power in excess of the limits of the UPS) will not be provided with UPS power. In this manner, during a power interruption, the CDU 100 may direct its available stored energy to the operational maintenance, only of the selected electrical components.

In one example embodiment, CDU 100 provides external electrical mains power 112 to all connected devices, such as power amplifiers, digital signal processors and audio network switches, but provides online UPS power only to network components. Since communication networks such as Ethernets do not respond well to power failures and generally take longer to reboot than conventional equipment, the selective application of UPS power to network components improves an audio system in a number of ways while limiting the required size of the UPS. If the power failure is short in duration, the functional network will remain ready to provide signal throughout the sound system the moment the power is restored to the remainder of the system. If the power failure is longer in duration, system operators will be provided the necessary time for an orderly shutdown of the network, prior the expiry of the UPS batteries.

In a sound system that includes rack mounted network components that require a separate power input, CDU 100 may provide a group of dedicated power outlets (for example, in an online UPS mode) in sufficient number and with sufficient capacity to maintain electrical power to all chosen components. Examples of such rack mounted network components include switches, routers, and/or network enabled DSP.

In some embodiments in which the UPS provides online power to selected components, a given component may be fed with both primary power (e.g. provided by the external mains power) and secondary power from the online backup power. The component may be configured to select an appropriate power source for use during operation. For example, the component may include sensing circuitry to sense the presence or absence of primary power, and the component may be programmed or otherwise configured to select the primary power as input power whenever the primary power is present, and the secondary power as input power when the primary power is absent. In some embodiments, the primary and secondary power may be provided with different voltages (e.g. 230 V for primary power and 36 V for secondary power), and the component may be capable of accepting either power source as input power. In some embodiments, as further described below, the secondary (backup) power may be low-voltage power (e.g. less than 40 V, and/or approximately 36 V) that is distributed to external audio devices via low-voltage rated wires, such as communications wires.

In one embodiment CDU 100 is programmed to communicate, in the event of an electrical power interruption, the power interruption condition to electronic components within the external audio devices via the control signal. For example, CDU 100 may be programmed to transmit instructions to the amplifiers in the external audio devices (or to a suitable controllers within the external audio devices that are configured to control the amplifiers) to stop reproducing audio signals (known as "muting" the amplifiers). Accordingly, in one embodiment, CDU 100 may be programmed to control, via the control signal, amplifiers within external audio devices connected to CDU 100, so in order to reduce the amplitude of, or discontinue reproduction of, audio signal in order to reduce power consumption.

In one example implementation, the UPS may be supplied by three phase mains, and can be a three phase UPS or a single phase UPS configured to provide power to any phase when power is not available on any or all of the phases.

In another embodiment, the UPS is an offline UPS, which provides power from batteries through an inverter only when external power 112 fails. The only power consumed during normal use is that which is necessary to maintain the batteries in a charged state. When using an offline UPS, the load is supplied directly from mains power, bypassing the inverter, which is either idle or completely off. Thus the inverter is described as being "offline". Upon power failure, the inverter is activated and a relay contactor disconnects the mains from and connects the inverter to the load. There is, as a consequence of contactor delay, a momentary interruption in the supply of electricity to the load. This embodiment, and variants thereof, is described further below with regard to FIG. 2.

In one embodiment, the CDU 100 may provide UPS power to all powered components within the powered loudspeakers of the sound system. Such an embodiment may be realized when the power requirements of the components residing in the powered loudspeakers are sufficiently low that power can be delivered by a UPS.

Figure 2:
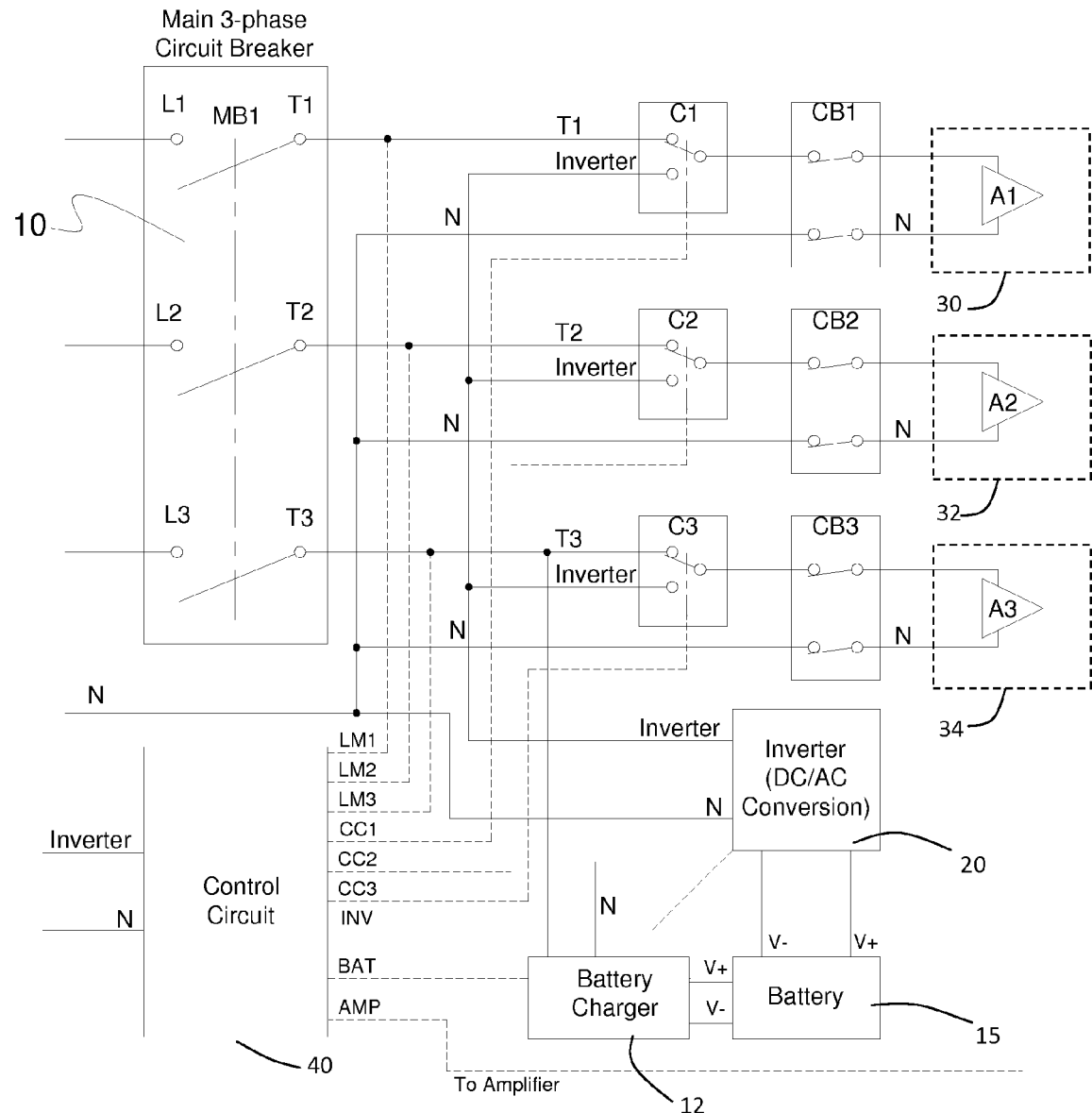
FIG. 2 is a block diagram illustrating the operation of an uninterrupted power source with the system.

Referring now to FIG. 2, a simplified block diagram is provided that illustrates an example embodiment in which of mains power and backup power distribution within CDU 100 is configured for providing at least a portion of the backup power to amplifiers within external audio devices following a loss of mains power. A kilowatt-scale inverter, such as one capable of providing power in the range of 2 KW, may be considered as an example implementation of this approach. Although this power may be insufficient to meet the full power needs of the amplifiers in the external audio devices 30-34, it may provide a fraction of the power requirements that is sufficiently high to maintain operation and potentially provide some functionality.

In this example, while the UPS may function as an online UPS for selected low-power components in the external audio devices (as described in the preceding embodiments), it can also act as an offline UPS for providing backup power to the amplifiers in the external audio devices, such that at least a portion of the power requirements of the amplifiers is satisfied by the backup power provided by the UPS. It is to be understood that although only the offline UPS connection paths for powering the amplifiers are shown in FIG. 2, additional online connections may be made from the UPS to other non-amplifier (i.e. lower power) components, as described above.

As shown in FIG. 2, external mains power is available at the three phase main circuit breaker identified as MB1 (10). The electrical power is received on input terminals (L1, L2 & L3). MB1 (10) serves as a point of disconnection from mains power, and, as overcurrent protection for the CDU 100. Electrical power passes from the output terminals of MB1, (T1, T2 &T3) to three single pole double throw contactors (C1, C2 & C3). In an example where mains power is available, C1, C2 & C3 receive electrical power from T1, T2 & T3 and transmit it to three corresponding circuit breakers (CB1, CB2 & CB3).

Electrical power is supplied to multiple amplifiers and associated electronics in the external loudspeaker array as represented by external audio devices 30, 32 and 34 containing amplifiers A1, A2 and A3, respectively. The neutral connection is also provided to complete the circuit. In this example the neutral is common to all components in the circuit and is noted as N.

According to the present embodiment, when mains electrical power is available, battery charger 12 is energized from mains power, as shown in FIG. 2, from T3 and a connection to the system neutral as shown by N. Battery charger 12 will typically convert AC mains power to a DC voltage suitable to battery 15 that is to be charged, and additionally will provide control and regulation of the charging process. Battery 15, thus energized, in turn powers DC to AC inverter 20.

In the presence of mains power, inverter 20 is continuously energized by UPS battery 15. From the DC output of battery 15, inverter 20 continuously produces AC power, which may be employed to energize a control circuit 40 that monitors and controls the behavior of the UPS and power distribution module via a plurality of control and communication lines shown as dashed lines.

The presence of electrical power may be monitored via lines LM1, LM2 & LM3; the contactors C1, C2 & C3 are controlled via lines CC1, CC2 & CC3; the status of inverter 20 is monitored and controlled via the line INV; battery charger 12 is monitored and controlled via the line BAT; and, certain aspects of the amplifiers and associated electronics in each array element are monitored and controlled via the line AMP (which represents here the control signal that is externally connected to the external audio devices, as shown in FIG. 1). These control and communications lines may vary in nature according to the requirement. In this example, the control signal may be a DC voltage, an AC voltage or a pair of conductors providing communication via RS485 protocol.

The UPS in this example functions as an online UPS for the control circuit an optionally for other low power devices in the audio system, as described above. In the event of a power failure, the control circuit (and other connected components) will run, uninterrupted from battery 15 and inverter 20. The function of the UPS as offline backup for amplifiers and associated electronics in the audio system is considered in greater detail below.

As noted above, a loudspeaker array including high powered array elements such as those used in a concert would require, in order to provide full backup power, a UPS that is much too large to be practically implemented. However, in the present example embodiment, the UPS acts as an offline UPS for providing at least a fraction of the power requirements of the amplifiers in the external audio devices.

CDU 100, upon sensing a power failure via one or more motoring devices, instructs, via the control signal, external amplifiers within the external audio devices (e.g. external array elements), to mute their outputs. At approximately the same time, contactors C1, C2 & C3 are energized, resulting in connection to the inverter output. Inverter power then passes through CB1, CB2 & CB3 to the amplifiers and electronics within the array elements.

The timing of this sequence may be managed in order to maintain operation of the audio system. In order to manage the sequence and timing of the operations, one can consider the time required to determine that a power failure has taken place, and the time required to mute an amplifier. Furthermore, the management of the sequence and timing may be coordinated by considering the nature of the power supplies of all devices connected to the offline UPS and the characteristics of the inverter that will supply the power to them.

In the present example embodiment, CDU 100 may optionally run on both 60 and/or 50 Hz AC power. Since the sine wave of 50 Hz AC has a longer period, it represents the worst design case in this example, and will be employed here. The period of a 50 Hz sine wave is 20 ms. Three half waves with a total period of 30 ms may be required to determine that a power failure has occurred.

The lowest audio frequency passed by a typical loudspeaker element is 30 Hz, with a period of 33 ms. In order to mute an audio signal without the generation of a click or pop sound, the muting operation may be performed during a time interval that approximately equal or greater to one period of the lowest frequency transmitted by the system. This will support the full muting of amplifiers approximately 60 ms after power failure.

Typical contactors such as C1, C2 & C3 have an actuation time of approximately 35 ms. Therefore, if the actuation of the contactor begins at approximately the same time as the mute command, the inverter will be supplying power very near the point in time where full muting is achieved.

All power supplies containing capacitance take a finite amount of time to dissipate the power stored in its capacitors. In the case of amplifiers under full operating load, the dissipation can be quite fast, with times as low as 100 ms. It is possible in the design of electronic equipment to strategically place additional capacitance near sensitive components such as microcontrollers, so that fluctuations in power supply voltage (such as a short term brownout) do not reboot the CPU. In order to improve the stability and function of the switch over to inverter power, the capacitance in the power supplies of affected devices can be increased as required.

In the event of a loss of mains power on any one of the phases shown as T1, T2 & T3, the function of the control circuit is to sense that loss and to actuate the associated contactor, one of C1, C2 or C3. Three phase power contains three separate sine waves that are each rotated in phase by 120 from the others. Output from the inverter is a single sine wave. When any of the three contactors switches from mains to inverter power a shift in the phase of that power line will occur. When all three contactors are switched to inverter power, the system will supply single phase power to the array elements. Power supplies in typical equipment are immune to such a phase shift.

Although the aforementioned embodiments including the distribution of backup power have focused on embodiments in which the backup power source is centralized within CDU 100, it is to be understood that the system may include one or more distributed backup power sources, such as rechargeable batteries. In some embodiments, the control signal is employed to control the failover between primary power and backup power at one or more locations within the audio system.

In both of the previous examples, a person skilled in the art will realize that many audio signal components carry external control signals that will be considered critical for system restart. Furthermore it is noted that while it is typical in many cases that the external control signal is encoded in the audio signal and therefore carried by the same conductors and by the same audio signal components, in some embodiments, the external control signal may be carried in separate conductors. Accordingly, in some example embodiments, CDU 100 provides UPS backup power to components in external audio devices that receive or transmit external control signals.

As noted above, CDU may provide redundant secondary audio signal paths, control signal paths, and/or backup power in addition to the original or primary signal path, control signal, and power.

In the event of failure of the primary audio signal, the secondary signal may be substituted, thus maintaining sound system integrity. This failover may be achieved by monitoring the status of the primary audio signal, and switching to distribute the secondary audio signal through integrated output interface 120 instead of the primary audio signal. Accordingly, CDU 100 and/or external audio devices 200-202 may include a controller, processor or other suitable device control the selection and routing of the audio signals Alternatively, both the primary and secondary audio signals can be distributed from integrated output interface 120 to the external audio devices 200-202, and the control signal can be employed to switch the primary audio signal to the secondary signal within the external audio device, for example, via a controller 220 (as shown in FIG. 1). Similarly, this redundancy and failover capability may be provided for the control signal. For example, in one embodiment, CDU 100 may provide primary and secondary audio signals (e.g. analog and digital signals) simultaneously to external audio device, where a controller or processor within the external audio device may select the best signal for its purpose.

Although FIG. 1 illustrates an embodiment in which a single, central CDU 100 is employed for the distribution of power, audio signals, and the control signal, it is to be understood that the embodiment shown in FIG. 1 is merely one example embodiment, and that other configurations may be achieved without departing from the scope of the present disclosure. For example, as shown in FIG. 3, the system may be implemented in a master-slave configuration, in which a master control and distribution unit (MCDU) 300 unit is interfaced with two or more slave control and distribution units (SCDUs) 350, and where each SCDU 350 is interfaced with one or more external audio devices 360.

Figure 3:
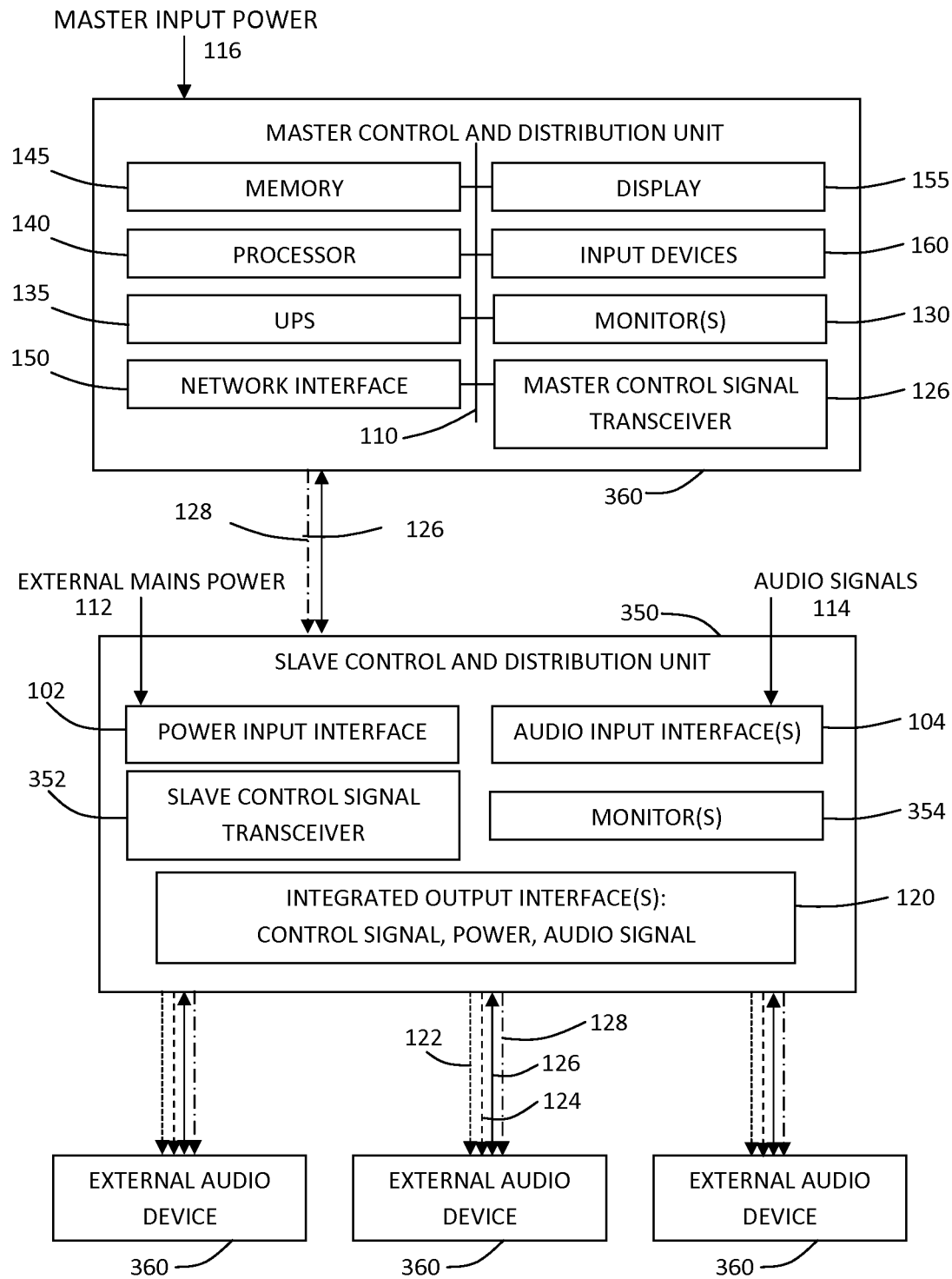
FIG. 3 is a block diagram illustrating another example audio system including a master control and distribution and a slave control and distribution unit interfaced with a loudspeaker enclosure assembly.

In the example embodiment shown in FIG. 3, MCDU 300 may include processor 140, memory 145, network interface 150, optional display 155, optional input devices 160, as in the embodiment shown in FIG. 1. As such, MCDU 300 acts as a central controller and interface device, as in the single unit embodiment of FIG. 1. MCDU 300 also includes master control signal transceiver 126, which transmits and receives control signal data to and from one or more SCDUs 350 via control signal path 126. MCDU also transmits and receives control signal data to and from external audio devices 360, but this is mediated by the slave control signal transceivers 352 in each SCDUs 350.

In addition to transmitting and receiving the control signal, MCDU 300 also distributes backup power, produced by UPS 135 of MCDU 300, to the one or more SCDUs 350 via path 128. It is noted that input power is provided to MCDU 300 (for powering UPS and other internal devices) via master power input 116. SCDUs 350 receive backup power from MCDU 300, and aggregate the backup power with the delivery of the audio signals, control signal, and primary power at integrated output interface 120. Accordingly, SCDUs 350 perform the role of aggregating the audio signal, control signal and power inputs and providing these to the one or more external audio devices 360 through an integrated interface. As in the case of the embodiment shown in FIG. 1, the primary power connection path 122, audio signal connection path 124, control signal connection path 126, and backup power connection path 128 may be aggregated into a single cable that is provided to each external audio device 360.

In the example embodiment shown in FIG. 3, the primary power is provided to the system through the SCDUs 350, instead of centrally through MCDU 300. This enables a high net power to be available through the system, and simplifies the design and operation of MCDU 300. For example, by providing three-phase primary power through multiple SCDUs 350, three single-phase output connections may be made to external audio devices 360 for each SCDU 350. Accordingly, such an embodiment improves the overall scalability of the system. Moreover, in an embodiment in which UPS 135 of CDU 300 does not, supply backup power to the amplifiers of the audio system, but only supplies backup power to relatively low-power electronic components such as network and DSPs, a single UPS may be configured to meet the backup requirements of a system including multiple slaves (SCDUs) with multiple external audio device for each slave. The following examples are presented to enable those skilled in the art to understand and to practice embodiments of the present disclosure. They should not be considered as a limitation on the scope of the present embodiments, but merely as being illustrative and representative thereof.

EXAMPLES

Figure 4:
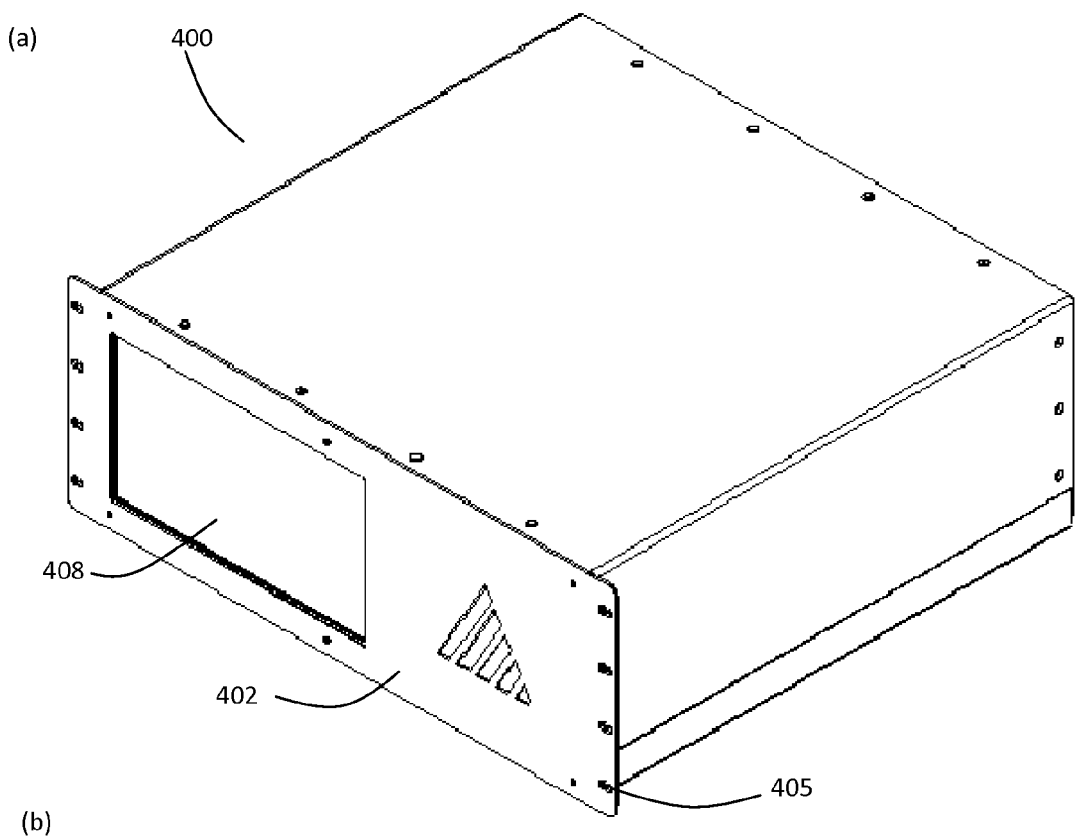
FIG. 4 illustrates an example embodiment of a master-slave control and distribution system, showing (a) an isometric view of the master unit, (b) the rear panel of the master unit.
Figure 4:
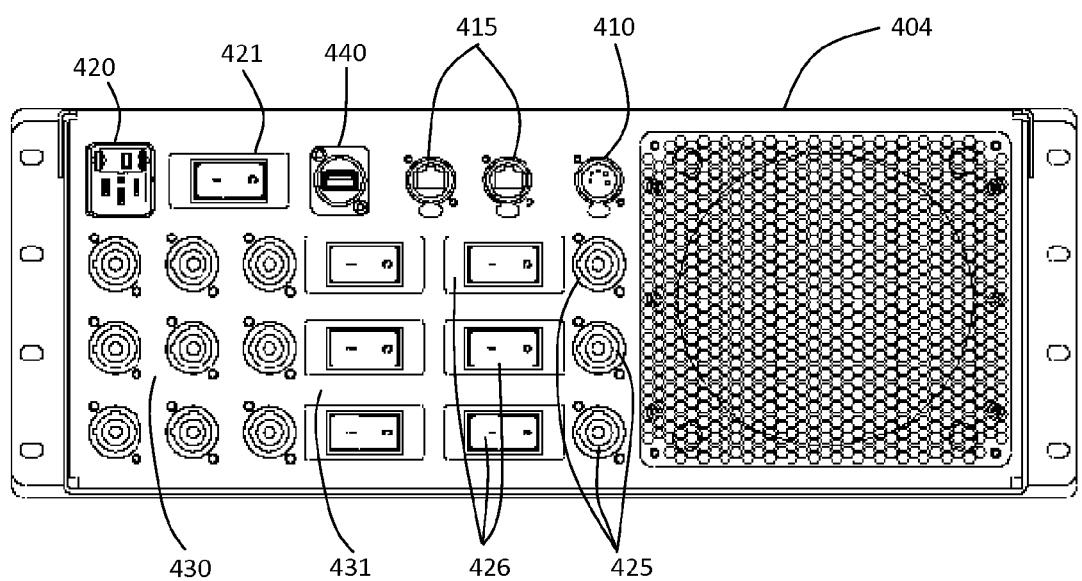
Figure 5:
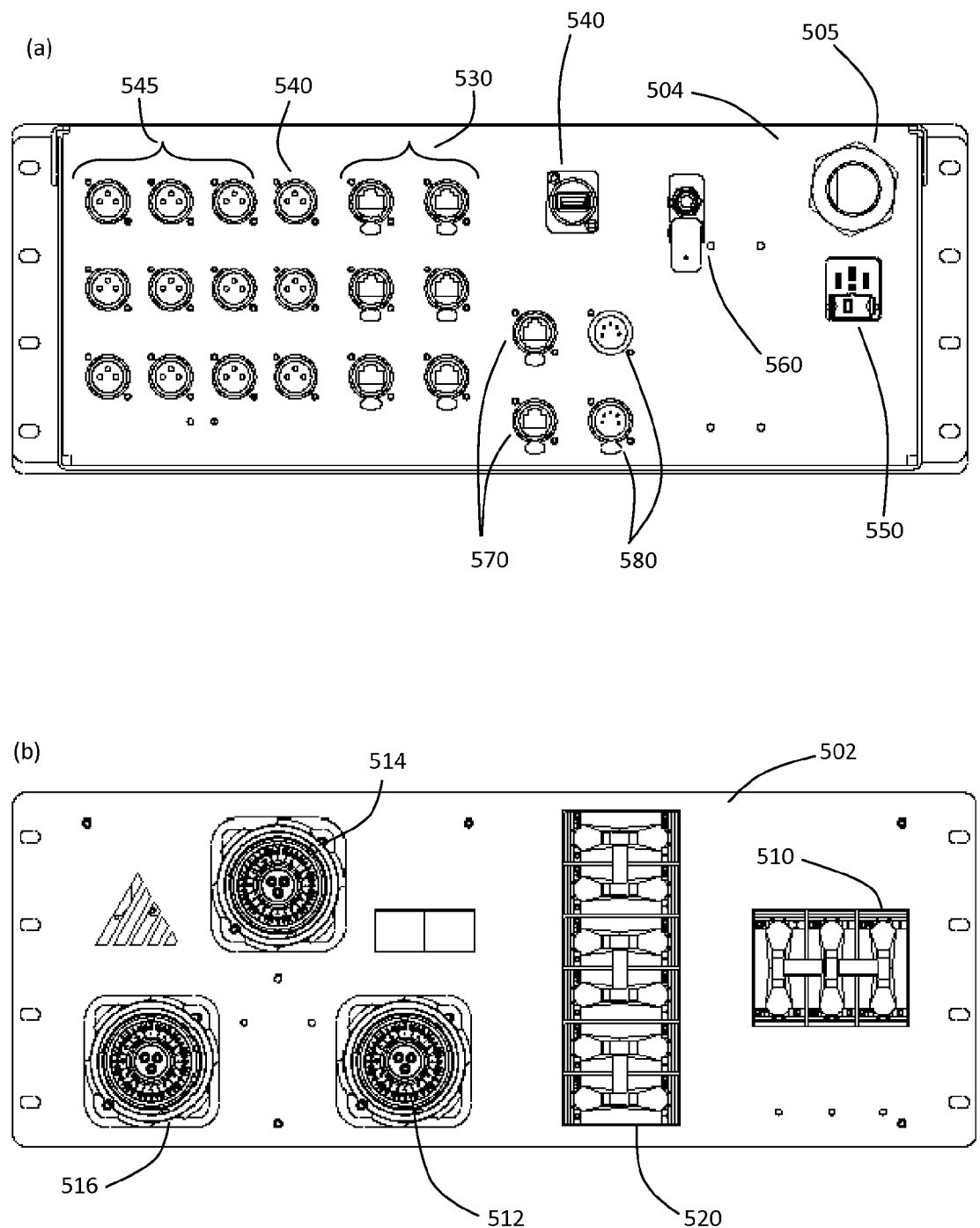
FIG. 5 illustrates an example embodiment of a master-slave control and distribution system, showing (a) the rear panel of the slave unit, (b) the front panel of the slave unit, and (c) an isometric view of the slave unit.

FIGS. 4 and 5 illustrate and example implementation of an audio system according the master/slave CDU embodiment disclosed above, showing a chassis with associated external connectors, switches, and display devices. FIGS. 4(a)-(c) provides views of example MCDU 400, which includes front panel 402, back panel 404, enclosure 406, and touchscreen display 408. FIG. 5 provides views of example SCDU 500, which includes front panel 502, back panel 504, and enclosure 506. Front panel 402 includes rack mounting holes 405.

Referring to FIG. 4(b), which shows back panel 404 of MCDU 400, serial port 410 is provided for transmitting and receiving control signals or data to and from MCDU 500. Also shown are Ethernet ports 415 for communicating with MCDU over Ethernet, or for connecting to an external computing device. External power is provided at power connector 420 (controlled by switch 421), and online UPS power is provided to up to three slave SCDUs 500 via output connectors 425, which are controlled by switches 426. For each slave, three additional power connectors are provided, with a corresponding switch, at 430 and 431, respectively, for providing online UPS power to additional components of the audio system, such as rack-mounted DSP and networking equipment. USB port 440 (and USB port 540 in FIG. 5) is provided for performing software upgrades.

Referring to FIG. 5(a)-(c), which shows rear panel 504 of SCDU 500, three phase power connector 505 is connected to electrical mains power. SCDU 500 is configured for distributing primary power, backup power, audio signals, and a control signal, to three external audio devices. Mains electrical power which is received through connector 505 is passed into the SCDU 500 and terminates at the three pole breaker 510 which provides a means of electrical disconnection from mains supply and as over-current protection for the power cable.

SCDU 500 also receives primary and secondary AVB audio at connectors 530 for each external audio device, and also additional backup audio signals (analog or digital) through full range audio input connector 540 and/or low, mid and high range audio input connectors 545. Serial ports 580 are provided for transmitting and receiving control signals and/or data. Ethernet ports 570 are provided for connecting to MCDU 400 for optional control and status monitoring, or to an external computing device.

Backup power from the UPS power output of MCDU 400 is received at power connector 550. Toggle switch 560 is provided for manually engaging power from the offline portion of the UPS power.

Three multi-pin connectors (512, 514 and 516) are provided in an integrated connector/interface for connecting to an external audio device via a single cable, where each multi-pin connector contains contacts for primary electrical power, backup power, audio signals, and the control signal. In this embodiment, each connector (512, 514, and 516) provides electrical power from one of the three phases present at the three phase power connector 505. The three circuit breakers 520 supply electrical power to the three multi connectors and provide over-current protection and a means of electrical disconnection for cable and equipment that is connected thereto.

As described above, the UPS may act as an online UPS, providing online backup power to lower-power components in external audio device. This online backup power may be delivered to external audio devices through low-voltage rated wires (such as communications wires) within cables connecting to connectors 512, 514 and 516. The UPS may alternatively or additionally act as an offline UPS for providing power to external amplifiers in the event of a power failure, by rapidly switching from the mains output to the output of the inverter within SCDU 500. As noted above, in order to perform backup power with sufficient rapidity to mute the remote amplifiers, the switching may be achieved following an appropriate sequence and with appropriate timing, as described above.

Figure 6:
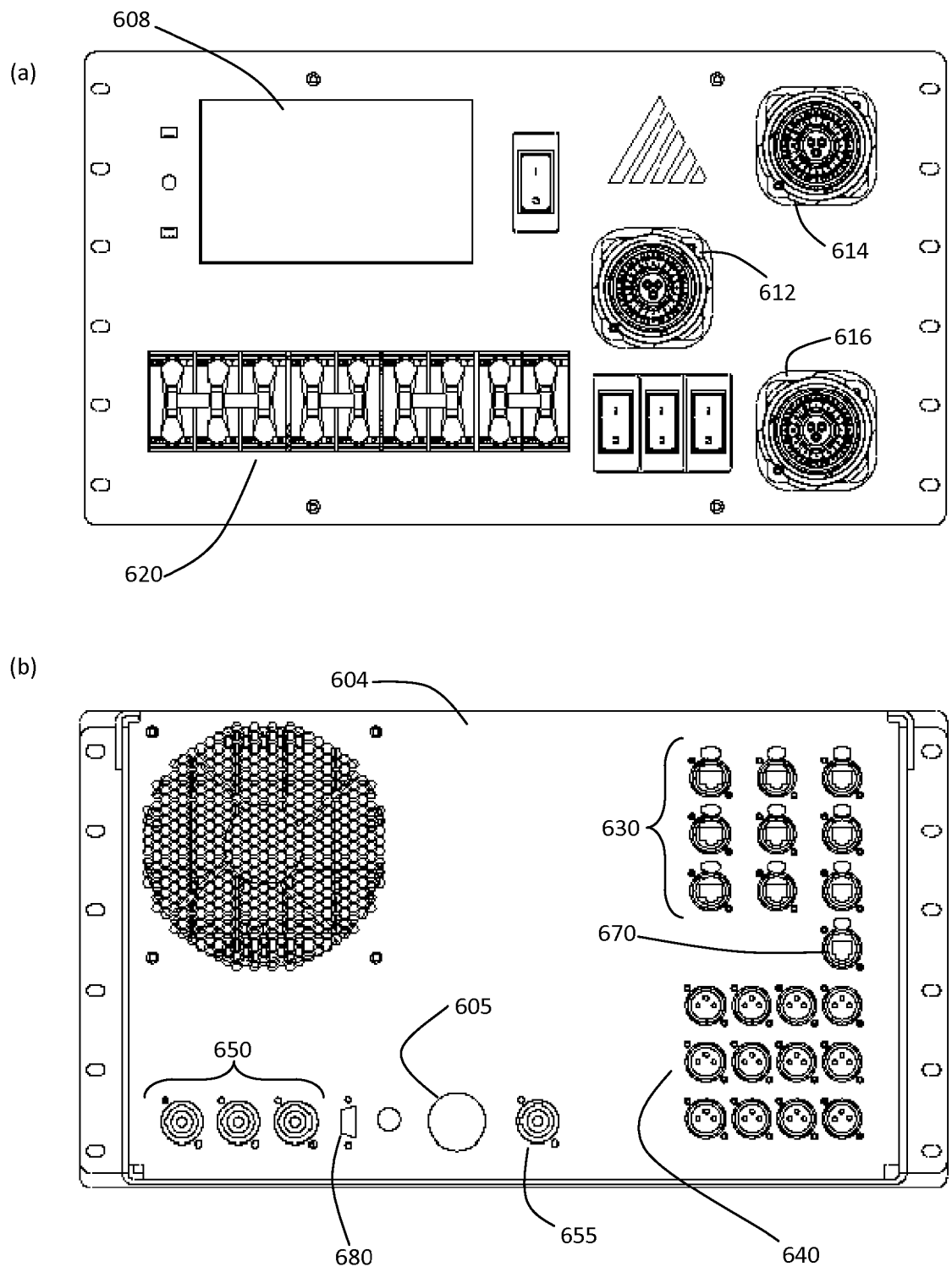
FIG. 6 illustrates an example embodiment of a single chassis control and distribution system, showing (a) the front panel of the unit, (b) the rear panel of the unit, and (c) an isometric view of the unit.

FIGS. 6 (*a*)-(*c*) illustrate an embodiment in which a single CDU 600 is provided that combines the functions of MCDU 400 and SCDU 500. CDU 600 includes front panel 602, back panel 604, enclosure 606, and touchscreen display 608, and internal UPS (not shown).

Primary and secondary AVB audio signals are received at connectors 630 for each external audio device, and also additional backup audio signals (analog or digital) through full range audio input connector and/or low, mid and high range audio input connectors 640. Control signals and/or data are transmitted to and/or received from external audio devices via connectors 612, 614 and 616. Ethernet port 670 and serial port 680 is provided for connecting to external computing devices. Output backup power connectors 650 and 655 are provided for optionally providing online backup power to additional external devices, such as network switches and/or DSP devices.

As in the embodiments shown in FIGS. 4 and 5, three multi-pin connectors (612, 614 and 616) are provided in an integrated connector/interface for connecting to an external audio device via a single cable, where each multi-pin connector contains contacts for primary electrical power, backup power, audio signals, and the control signal. In this embodiment, each connector (612, 614, and 616) provides electrical power from one of the three phases present at the three phase power connector 605. The four circuit breakers 520 supply electrical power from the mains input connector 605 to the three multi connectors and provide over-current protection and a means of electrical disconnection for cable and equipment that is connected thereto.

Figure 7:
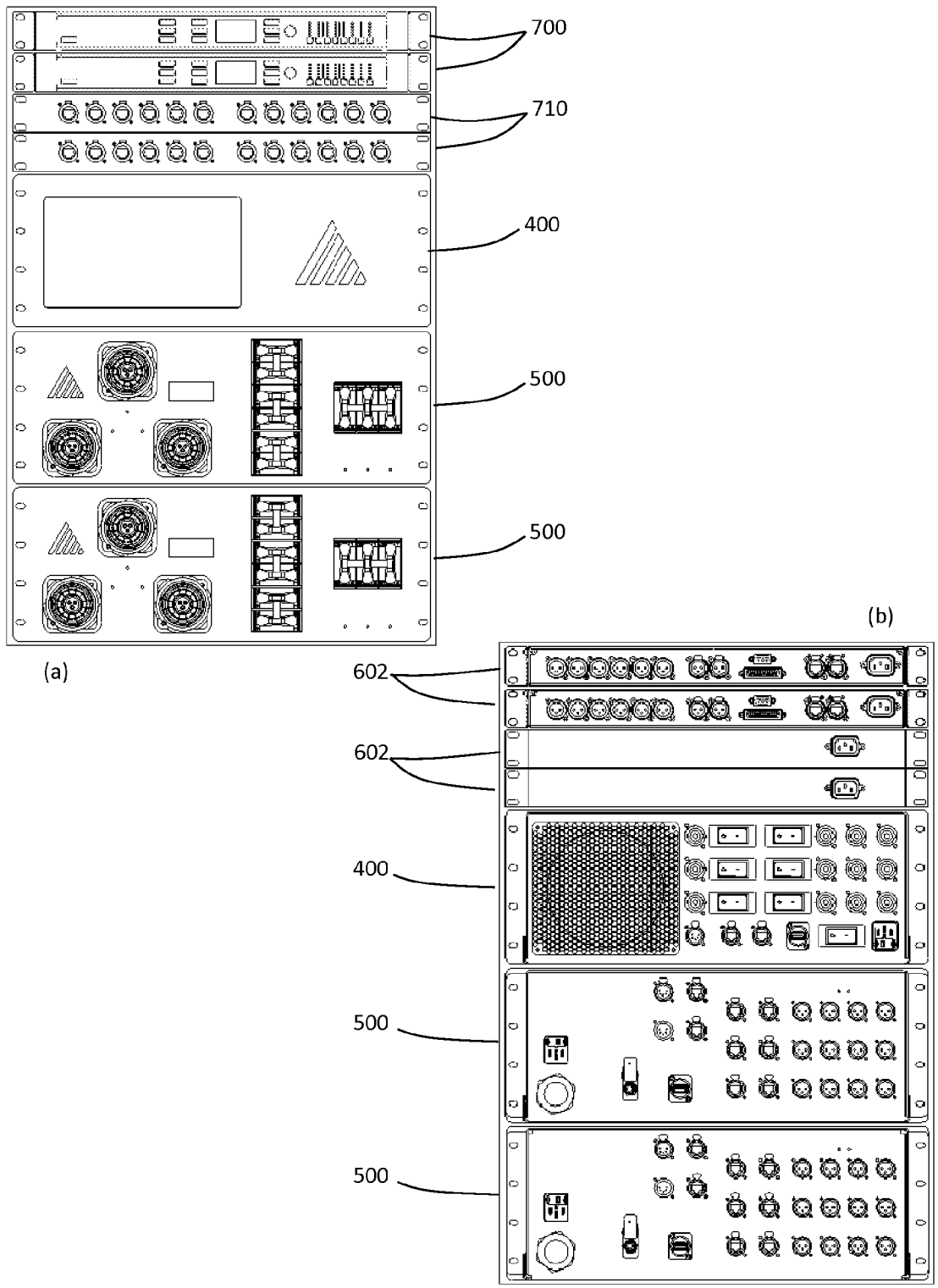
FIG. 7 shows (a) front and (b) rear views of a rack mounted system including a master-slave control and distribution system.

FIG. 7 shows a rack mounted master-slave system including one MCDU 400, two SCDUs 500, two DSP units 700, and two network switch units 710, where FIG. 7(*a*) shows a front view, and FIG. 7(*b*) shows a rear view. In this example, network audio is the primary audio signal and analog audio provides a failover signal. Network switching is provided by network switches 710, and analog audio is provided via programmable DSP units 700. SCDUs optionally provide online backup power to network switches 710 and DSP units 700.

Embodiments of the disclosure, as described above, employ several different protocols for communication between various components of the system. Additional protocols which may be employed are henceforth disclosed: RS485 for data communication between sub-system (e.g. between an external UPS and CDU 100, and between CDU 100 and external audio devices); RS23, e.g. for system debugging (e.g. between UPS main-board and PC, between PDS main-board and PC, between End-point board and PC); SPI, for data communication between devices (e.g. between processor and energy measuring/monitoring devices in CDU and/or UPS, between CPU of Communication Module (CM) and CPU of Class-D Amplifier (CDA), between CPU of Communication Module (CM) and CPU of End-point Module); Ethernet for data communication over a computer network (e.g. control and database access on UPS (connector at back of UPS), control and database access on CDU); Ethernet AVB for data communication over a computer network with audio/video streams support (e.g. audio streams to End-point Module (EP) (connector via back of CDU), control and database access on End-point (connector via back of PDS), audio streams generated from Base AVB Gateway); I2C (Inter-integrated Circuit) for device control and communication (e.g. between UPS CPU and Inverter Module, between UPS CPU and Battery Charger Module, between UPS CPU and touch screen, between CDU CPU and LED Control, between CM CPU and Inclinometer, between CM CPU and ID recovery IC, between CDA CPU and Temperature Sensors); I2S (Integrated Interchip Sound) for time division audio communication between devices (e.g. between AVB gateway and DSP engine on End-point Module, between DSP engine and audio codec on End-point Module, between audio codec and AVB CPU on Base AVB Gateway), USB (Universal Serial Bus) for portable data communication with subsystem or firmware upgrade and file transfer for UPS unit (connector at back of UPS) (e.g. firmware upgrade and file transfer for PDS unit (connector at back of PDS), firmware upgrade and file transfer for Speaker Box (via connector at back of UPS)); JTAG for on-board system programming and debugging (on main-board of UPS, on main-board of CDU, on communication module, on Class-D Amplifier, on End-point Module); and additional protocols including but not limited to Bluetooth (wireless) (e.g. on UPS and CDU unit for short range device communication; e.g. keyboard, mouse and headphone); Can bus (Controller Area Network) (on UPS and CDU for long range device control), and SCSI (Small Computer System Interface) (e.g. on UPS unit for large data storage).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. An audio, control and power distribution system for providing redundant power, audio and control to one or more external audio devices, the audio, control and power distribution system comprising:

an input power interface for receiving external mains power to provide primary power to the one or more external audio devices;

a plurality of input audio interfaces for receiving primary audio signals and secondary audio signals, wherein each primary audio signal has a respective primary control signal encoded therein;

a transceiver for transmitting and/or receiving an additional control signal;

a processor operatively coupled to the transceiver for generating and/or processing the additional control signal; and an output interface for delivering the primary power, backup power, primary audio signals with encoded primary control signals, secondary audio signals, and additional control signal to each external audio device; and a backup power source for generating the backup power;

wherein the primary power, backup power, primary audio signals, secondary audio signals, primary control signal and additional control signal are provided such that the external audio devices are separately capable of:

switching from the primary power to the backup power in the event of failure of the primary power;

switching from the primary audio signals to the secondary audio signals in the event of failure of the primary audio signals; and switching from the primary control signal to the additional control signal in the event of failure of the primary control signal.

2. The audio, control and power distribution system according to claim 1 wherein said backup power source is an uninterruptable power source for generating the backup power, and wherein said uninterruptable power source is configured to receive power from the external mains power.

3. The audio, control and power distribution system according to claim 2 wherein said uninterruptable power source is further configured for providing backup power to one or more additional electronic devices that do not reside within the external audio devices.

4. The audio, control and power distribution system according to claim 3 wherein the additional electronic devices are selected from the group consisting of amplifiers, DSP electronics, and network components.

5. The audio, control and power distribution system according to claim 2 wherein said uninterruptable power source is configured to provide backup power for a selected subset of electronic components of the external audio devices without providing full backup power to amplifiers of the external audio devices.

6. The audio, control and power distribution system according to claim 2 wherein said uninterruptable power source is configured to operate in an online mode for providing backup power to one or more non-amplifier electronic components.

7. The audio, control and power distribution system according to claim 6 wherein one or more of said non-amplifier electronic components are network components for preserving network connectivity in the event of a power failure.

8. The audio, control and power distribution system according to claim 6 wherein said uninterruptable power source is configured to provide backup power to components within the external audio devices having a power requirement less than a selected threshold.

9. The audio, control and power distribution system according to claim 8 wherein said threshold is approximately 100 W.

10. The audio, control and power distribution system according to claim 8 wherein said threshold is approximately 50 W.

11. The audio, control and power distribution system according to claim 2 wherein said uninterruptable power source is configured to operate in an offline mode, wherein said processor is configured to control the power provided to the one or more electronic components of the external audio devices, such that in the absence of the external mains power, the backup power is provided to the one or more electronic components.

12. The audio, control and power distribution system according to claim 11 wherein the one or more electronic components include one or more amplifiers.

13. The audio, control and power distribution system according to claim 12 wherein the backup power is provided to the amplifiers within a time duration suitable for muting the amplifiers without substantial audible distortion.

14. The audio, control and power distribution system according to claim 12 wherein said processor is configured to:
    detect the occurrence of a power failure based on a measured signal; and
    in the event of a power failure, transmit instructions to one or more amplifier controllers to mute the amplifiers within the external audio devices.

15. The audio, control and power distribution system according to claim 14 wherein said processor is configured to detect the power failure and to transmit the instructions to the one or more amplifier controllers within a time duration that is less than approximately one period of the lowest frequency transmitted by said audio, control and power distribution system.

16. The audio, control and power distribution system according to claim 12 wherein the backup power provided to the amplifiers is a fraction of the power required by the amplifiers during normal operation.

17. The audio, control and power distribution system according to claim 1 wherein said output interface includes at least one integrated connector for providing the primary power, the audio signals, and the control signal to at least one of said external audio devices.

18. The audio, control and power distribution system according to claim 1 further comprising one or more control input interfaces for receiving an external control signal.

19. The audio, control and power distribution system according to claim 1 further comprising a display device connected or connectable to said processor, wherein said display device is configured to provide a user interface for interactively observing and operating aspects of the audio, control and power distribution system control and distribution system and the external audio devices connected to the system.

20. The audio, control and power distribution system according to claim 19 wherein said display device is connectable to said processor through a wireless interface.

21. The audio, control and power distribution system according to claim 1 further comprising an input means for receiving control instructions from a user, and wherein said processor is configured to transmit the control instructions to a controller in said external audio device through the control signal.

22. The audio, control and power distribution system according to claim 1 wherein components of said audio, control and power distribution system are provided in a single chassis.

23. The audio, control and power distribution system according to claim 1 wherein said audio, control and power distribution system is configured as a master audio, control and power distribution unit and one or more slave audio, control and power distribution units, wherein each slave audio, control and power distribution unit includes at least one integrated output connector.

24. The audio, control and power distribution system according to claim 23 wherein one input power interface and one or more input audio connectors are provided in each slave audio, control and power distribution unit, and wherein the master audio, control and power distribution unit is configured to transmit and receive control signals to each slave audio, control and power distribution unit.

25. The audio, control and power distribution system according to claim 1 further comprising said one or more external audio devices, wherein one or more of said external audio devices includes:
    at least one monitoring device;
    an external transceiver for transmitting information obtained from said monitoring device through the control signal.

26. The audio, control and power distribution system according to claim 25 wherein said processor is configured to:
    detect a power failure based on the information transmitted through the control signal; and
    in the event of a power failure, transmit instructions to one or more amplifier controllers to mute the amplifiers within the external audio devices.

27. The audio, control and power distribution system according to claim 25 wherein said one or more of said external audio devices further includes:
a controller for controlling an electronic component within said external audio device in response to instructions provided by through the control signal.

28. The audio, control and power distribution system according to claim 1 wherein system is configured to monitor one or more parameters associated with the mains power.

29. The audio, control and power distribution system according to claim 28 wherein said one or more parameters associated with the mains power are selected from the group consisting of frequency, current, voltage and quality/distortion of mains sine wave.

30. The audio, control and power distribution system according to claim 28 wherein said one or more parameters associated with the mains power includes mains power consumption of the system.

31. The audio, control and power distribution system according to claim 28 wherein said one or more parameters associated with the mains power are displayable to a user through a user interface connected to the system.

32. The audio, control and power distribution system according to claim 1 wherein said integrated output interface comprises a plurality of integrated output connectors, wherein each integrated output connector is configured to connect to a single integrated cable for delivering the primary power, backup power, primary audio signals, secondary audio signals, primary control signal, and additional control signal to a given external audio device.

33. The audio, control and power distribution system according to claim 1 wherein the backup power is provided by an external uninterruptable power source.

34. An audio, control and power distribution system for operating one or more external audio devices, comprising:
an input power interface for receiving external mains power and for providing primary power for the one or more external audio devices based on the external mains power;
one or more input audio interfaces for receiving primary audio signals;
an output interface provided for external audio devices, wherein said output interface is configured to provide the primary power, the audio signals, and a control signal to the external audio devices;
a transceiver for transmitting and/or receiving the control signal;
a processor operatively coupled to the transceiver for generating and/or processing the control signal;
an uninterruptable power source for generating backup power for one or more electronic components of the external audio devices, wherein said uninterruptable power source is configured to receive power from the external mains power, and wherein said output interface is further configured to provide the backup power to the external audio devices;
wherein said uninterruptable power source is configured to operate in an online mode for providing backup power to one or more non-amplifier electronic components; and
wherein said uninterruptable power source is configured to provide backup power to components within the external audio devices having a power requirement less than a selected threshold.

35. The audio, control and power distribution system according to claim 34 wherein said uninterruptable power source is configured to operate in an offline mode for providing backup power to amplifiers of the external audio devices.

36. The audio, control and power distribution system according to claim 35, wherein said processor is configured to:
detect the occurrence of a power failure based on a measured signal; and
in the event of a power failure, transmit instructions to one or more amplifier controllers to mute the amplifiers within the external audio devices, wherein said instructions are transmitted to the amplifier controllers within a time duration suitable for muting the amplifiers without substantial audible distortion, the time duration being less than approximately one period of the lowest frequency transmitted by said audio, control and power distribution system; and
wherein said processor is configured to control the power provided to amplifiers of the external audio devices, such that in the absence of the external mains power, the backup power is provided to the amplifiers within the time duration suitable for muting the amplifiers without substantial audible distortion.

37. An audio, control and power distribution system for operating one or more external audio devices, comprising:
an input power interface for receiving external mains power and for providing primary power for the one or more external audio devices based on the external mains power;
one or more input audio interfaces for receiving audio signals;
an output interface provided for external audio devices, wherein said output interface is configured to provide the primary power, the audio signals, and a control signal to the external audio devices;
a transceiver for transmitting and/or receiving the control signal;
a processor operatively coupled to the transceiver for generating and/or processing the control signal;
an uninterruptable power source for generating backup power for one or more electronic components of the external audio devices, wherein said uninterruptable power source is configured to receive power from the external mains power, and wherein said output interface is further configured to provide the backup power to the external audio devices;
wherein said uninterruptable power source is configured to operate in an offline mode for providing backup power to amplifiers of the external audio devices;
wherein said processor is configured to:
detect the occurrence of a power failure based on a measured signal; and
in the event of a power failure, transmit instructions to one or more amplifier controllers to mute the amplifiers within the external audio devices, wherein said instructions are transmitted to the amplifier controllers within a time duration suitable for muting the amplifiers without substantial audible distortion, the time duration being less than approximately one period of the lowest frequency transmitted by said audio, control and power distribution system; and
wherein said processor is further configured to control the power provided to amplifiers of the external audio devices, such that in the absence of the external mains power, the backup power is provided to the amplifiers within the time duration suitable for muting the amplifiers without substantial audible distortion.

38. An audio, control and power distribution system for providing redundant power, audio and control to one or more external audio devices, the audio, control and power distribution system comprising:
- an input power interface for receiving external mains power to provide primary power to the one or more external audio devices;
- a plurality of input audio interfaces for receiving primary audio signals and secondary audio signals;
- a transceiver for transmitting and/or receiving a primary control signal and a secondary control signal;
- a processor operatively coupled to the transceiver for generating and/or processing the primary control signal and the secondary control signal;
- an output interface for delivering the primary power, backup power, primary audio signals, secondary audio signals, primary control signal, and secondary control signal to each external audio device; and
- a backup power source for generating the backup power;
- wherein the primary power, backup power, primary audio signals, secondary audio signals, primary control signal and the secondary control signal are provided such that the external audio devices are separately capable of:
- switching from the primary power to the backup power in the event of failure of the primary power;
- switching from the primary audio signals to the secondary audio signals in the event of failure of the primary audio signals; and
- switching from the primary control signal to the secondary control signal in the event of failure of the primary control signal.

39. An audio, control and power distribution system for providing redundant power and audio to one or more external audio devices, the audio, control and power distribution system comprising:
- an input power interface for receiving external mains power to provide primary power to the one or more external audio devices;
- a plurality of input audio interfaces for receiving primary audio signals and secondary audio signals;
- a transceiver for transmitting and/or receiving a control signal;
- a processor operatively coupled to the transceiver for generating and/or processing the control signal;
- an output interface for delivering the primary power, backup power, primary audio signals, secondary audio signals, and control signal to each external audio device; and
- a backup power source for generating the backup power;
- wherein the primary power, backup power, primary audio signals, secondary audio signals, and control signal are provided such that the external audio devices are separately capable of:
- switching from the primary power to the backup power in the event of failure of the primary power;
- switching from the primary audio signals to the secondary audio signals in the event of failure of the primary audio signals.

* * * * *